United States Patent
Brown et al.

(10) Patent No.: US 10,075,469 B1
(45) Date of Patent: Sep. 11, 2018

(54) ASSURED ENCRYPTED DELIVERY

(71) Applicant: Amazon Technologies, Inc., Reno, NV (US)

(72) Inventors: Nicholas Howard Brown, Seattle, WA (US); Gregory Branchek Roth, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 38 days.

(21) Appl. No.: 14/841,463

(22) Filed: Aug. 31, 2015

(51) Int. Cl.
*H04L 29/00* (2006.01)
*H04L 29/06* (2006.01)
*H04L 12/58* (2006.01)

(52) U.S. Cl.
CPC ............ *H04L 63/166* (2013.01); *H04L 51/30* (2013.01); *H04L 63/0428* (2013.01)

(58) Field of Classification Search
CPC ............ G06Q 10/107; G06Q 20/3674; G06Q 20/401; G06Q 20/3821; G06Q 20/4012
See application file for complete search history.

(56) References Cited

U.S. PATENT DOCUMENTS

| | | | |
|---|---|---|---|
| 6,732,101 B1* | 5/2004 | Cook | G06Q 10/107 |
| 2006/0031670 A1* | 2/2006 | Price, III | H04L 29/06 |
| | | | 713/150 |
| 2008/0098237 A1* | 4/2008 | Dung | H04L 12/58 |
| | | | 713/189 |

* cited by examiner

*Primary Examiner* — Ghazal Shehni
(74) *Attorney, Agent, or Firm* — Hogan Lovells US LLP (57) ABSTRACT

Information can be added to the headers of email messages to ensure the messages are delivered using encryption, without the user having to manage keys or perform the encryption. A user can select an option in an email program that causes a flag to be added to the message header. Each mail server along the delivery path can provide (or expose) information about the type(s) of encryption supported, and if the encryption is not sufficient then the message will not be delivered to that server. This ensures the transport will remain encrypted before delivering the message to the next hop along the path. If the message cannot be delivered encrypted then the message will not be transmitted past that point. An end user then only needs to click a button or perform another such action to ensure encrypted message delivery.

21 Claims, 6 Drawing Sheets

ASSURED ENCRYPTED DELIVERY

BACKGROUND

Users are increasingly utilizing electronic devices to transmit and receive information. In many instances, the users want or expect these transmissions to be secure. It is often the case, however, that these transmissions are able to be monitored or "snooped" during the transmission, whether by a governmental entity, malicious software, or another such source. Certain conventional approaches attempt to encrypt the communications in order to minimize the likelihood of the message contents being accessible during transport, but these approaches have various deficiencies. For example, communications can be encrypted at the message level, such as by using Pretty Good Privacy (PGP), whereby each party to a message must establish trust with the other parties to the message and must have the corresponding email encryption installed. These requirements have led to a high barrier to use and thus a relatively low level of adoption. Encryption can also be performed at the transport layer, where the encryption is performed by the mail servers rather than the end user. Using a protocol extension such as STARTTLS enables a plain text connection to be converted to an encrypted connection, such as may utilize the Transport Layer Security (TLS) or Secure Sockets Layer (SSL) cryptographic protocol. These approaches are best effort, however, meaning that the connection is not encrypted unless both mail servers to the connection support the extension. There is then no guarantee that the communication will remain encrypted in transit, such that the message may be susceptible to interception attacks.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to securely transmitting information in an electronic environment. In particular, various embodiments allow for the inclusion of a flag or other indicator in the header of a message that indicates that the message is to be delivered via an encrypted channel. When a mail server along the delivery path receives the message, that server can contact the next server along the path to attempt to determine the type(s) of encryption supported by the next server. The determination can involve any of a number of different actions, such as querying the next server or checking a certificate for the next server, among other such options. The server currently managing the transmission can compare the supported encryption against encryption information for the message, as may be specified by the flag, a policy, or other such source. If the next server is able to support the appropriate encryption then the message can be delivered to the next server, which can perform a similar check before delivering the message to another server or hop along the delivery path (if one exists). If not able to support the encryption, the message delivery can be terminated or another appropriate action can be taken, such as by sending a notification about insufficient encryption to an intended recipient of the message. In some embodiments a minimum level or score of encryption might be specified, which enables the message to be delivered in cases where servers might not support a specific type or combination of encryption approaches. In this way, the message is only delivered to servers that support the delivery approach and the specified encryption, whereby the user can ensure encrypted delivery without having to encrypt the message, manage keys, or perform other such tasks.

Various other functions and advantages are described and suggested below as may be provided in accordance with the various embodiments.

Figure 1:
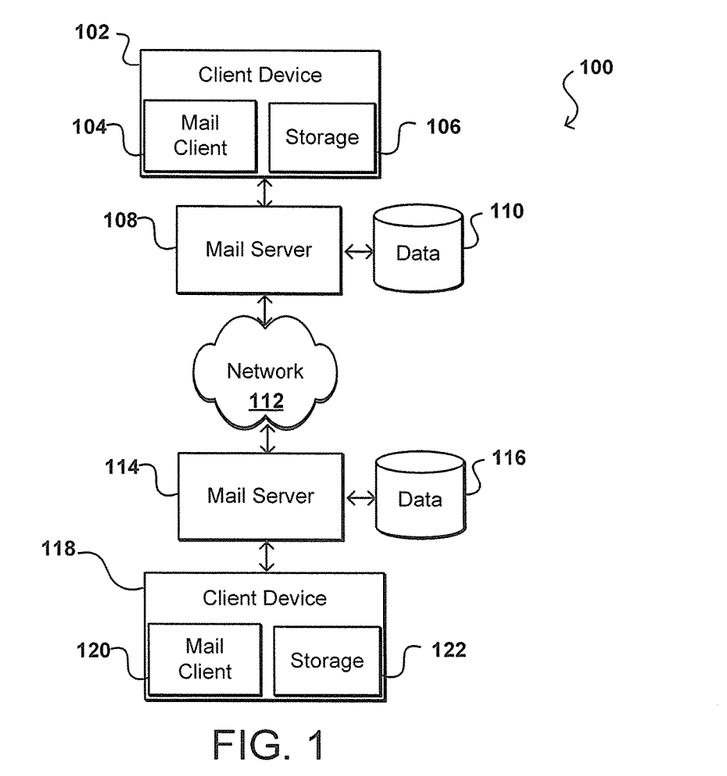
FIG. 1 illustrates an example environment in which aspects of the various embodiments can be that can be utilized.

FIG. 1 illustrates an example environment 100 in which aspects of the various embodiments can be implemented. In this example, a first client device 102 is operable to execute a mail client 104, browser, or other such interface or application that is able to send and receive mail messages or other such communications. The client device can be any appropriate computing device capable of processing instructions and sending communications, as may include a tablet computer, a smart phone, an electronic book reader, a desktop computer, a notebook computer, a personal data assistant, a smart phone, a video gaming console, a television set top box, a wearable computer (e.g., a smart watch or glasses) or a portable media player, among others. The client device can also include data storage 106 for storing received communications, email addresses, and the like. The client device 102 can receive instructions or input from a user to cause a message to be sent to an intended recipient, as may correspond to a mail client 120 executing on a second client device, herein referred to as a recipient device 118. As known for such purposes, the mail client can receive a selection or input of an email address (or other address or destination) that corresponds to a user (or other aspect or relation) of the recipient device 118, whereby a recipient can use the mail client 120 on the recipient device to access the message once received. The recipient device can also include storage 122 for storing contact information and the like.

In order for the communication to be transmitted to the recipient device 118, the communication in this example must pass through a pair of mail servers 108, 114, although in certain situations one or several mail servers might be used for such purposes. Further, although shown as separate components the mail servers can be part of the client devices or email clients in some embodiments, among other such alternatives. In this example, a first mail server 108, or mail exchanger, manages email (or other communications) for the mail client 104 installed on the client device 102. The mail server in some embodiments is a computing device including software and configured to act as a mail transfer agent (MTA) or other such agent for transmitting communications using a protocol such as the Simple Mail Transfer Protocol (SMTP). When the user selects a "submit" or similar option of the mail client 104, the message can be queued for transmission, which in this example includes uploading to the mail server 108. The mail server 108 can include a data repository 110 to store data, such as user data, that can be used to ensure that the user has an account and/or authorization to send the message through the mail server 108. The data can include other information as well, such as requirements or preferences for how the message is to be transmitted, policies that can apply to the transmission, etc. The mail server 108 can determine a path along which to transmit the message to be delivered to the appropriate mail server 114, from which the mail client 120 on the recipient device 118 can obtain the message.

In this example, the message may be relatively secure between the client device 102 and the mail server 108, as well as between the recipient device 118 and the corresponding mail server 114, as the message might be transmitted over a private or protected network. Unless the client devices are all within the same protected environment, however, the communication will eventually pass over a public (or at least unprotected) network in many situations. For email communications, this typically involves sending the communications between the mail servers 108, 114 across at least one network 112, as may include the Internet, a wireless data network, and the like. Once the message is out on a network such as the Internet, the user generally has little to no control over how the message is handled, such that the message can be susceptible to interception, monitoring, sniffing, or other such processes that can potentially cause information in the communication to be exposed to an unintended third party. As mentioned above, approaches exist at the message and transport layers for encrypting a message or transmission, but these approaches have various deficiencies that prevent them from being widely adopted and sufficiently reliable.

Figure 2:
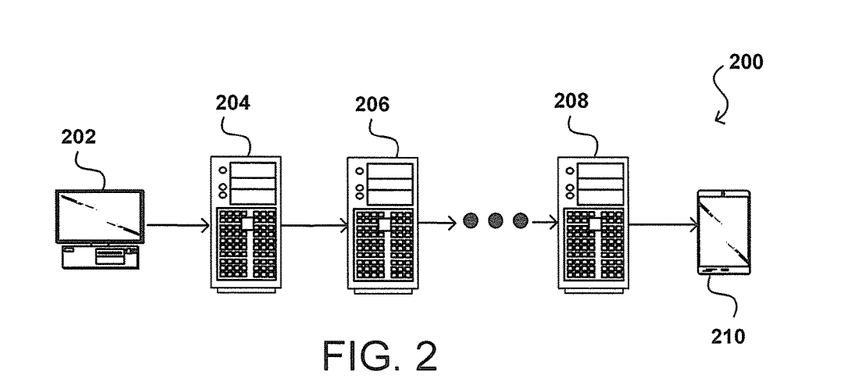
FIG. 2 illustrates an example path between mail clients that can be used to implement aspects of the various embodiments.

The problems can be exacerbated when there are multiple mail servers or "hops" along the path to deliver a communication. For example, FIG. 2 illustrates one such example path 200 that can be used to deliver a communication in accordance with various embodiments. In this example, a mail message is to be transmitted from a sender client device 202 to a recipient client device 210, or at least to a mail server 208 from which the recipient device can obtain the message. As illustrated, there can be any number of mail servers (or mail agents) along the path between the devices. A protocol such as SMTP can be used to determine the appropriate path, as well as the appropriate hops along the path. In the example of FIG. 1, there were two mail servers along the path, such that the servers can agree on transmission requirements before the message is transmitted, such as by using the STARTTLS approach discussed earlier. In the situation of FIG. 2, however, there can be many mail servers or agents along the path, and once the message is out along the path the user and initial mail server 204 will generally have no control over how the message is transmitted downstream between other components 206, 208 along the path using conventional approaches.

Accordingly, approaches in accordance with various embodiments provide mechanisms for enabling a message to include one or more instructions or requirements for transmitting the message between components along such a path. In this way, even though there may be no direct control over components along the path, any component that receives the message will have been determined to support the requirements, and the message can be prevented from being delivered to any component that does not include such support. By preventing the message from being delivered to such a component, the sender can know that the transmission will either be encrypted as intended or not completed, although other options can be utilized as well as discussed and suggested elsewhere herein.

Figure 3:
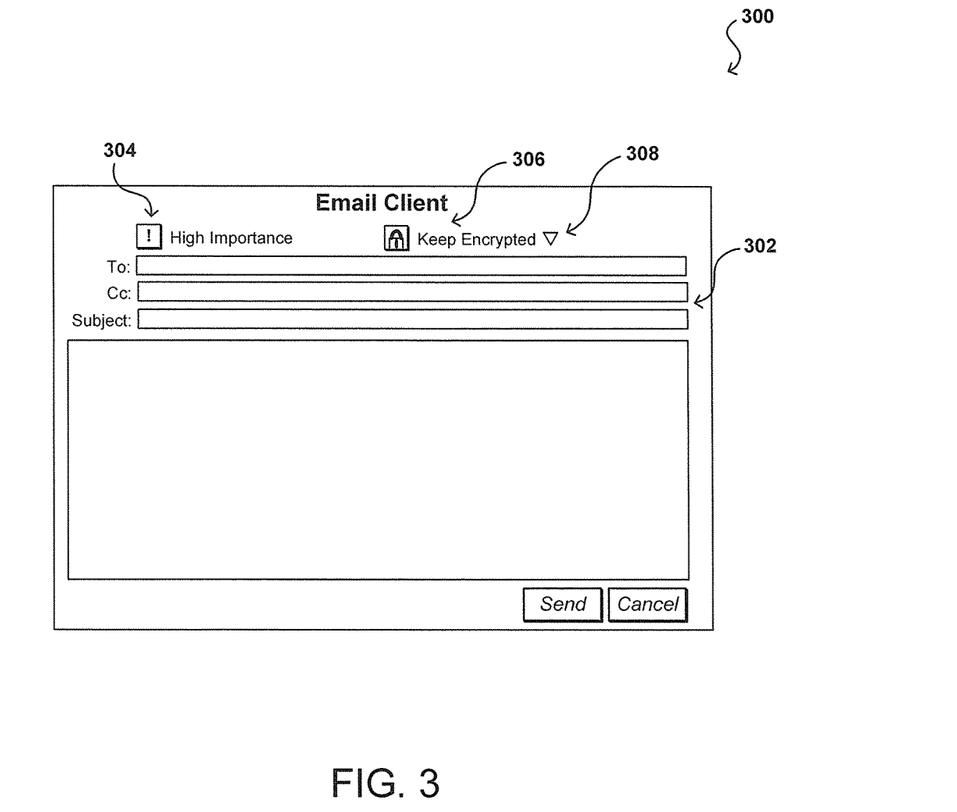
FIG. 3 illustrates an example user interface that can be utilized in accordance with various embodiments.

In one embodiment, a sender is able to set a flag or otherwise cause information to be added to the message, such as by inserting a string or value in a header of the message. As an example, FIG. 3 illustrates an interface 300 for an email client that can be utilized in accordance with various embodiments. This example interface includes various fields 302 found in conventional email clients, as enable a user to input recipients, subject lines, body text, and the like. The interface 300 also includes options that enable the user to specify information about the message. For example, the interface includes an option 304 to "flag" the message as being of high importance. As known for such flags, an email client receiving the message can display an icon or color with the message that indicates to the recipient (or other reader) that the message includes priority content or otherwise should be regarded as being of particular importance. Approaches in accordance with various embodiments can utilize a similar approach to managing security for a message, as a user can select an option 306 to "flag" the message as required to be transmitted using encryption, or other such security mechanisms. The flag can include information such as a tag, string, parameter value, or other metadata inserted into the header of the message, among other such options. The encryption corresponding to the flag can be a determined encryption, such as a type or level of encryption to be used, or can be specified by the user or a policy, among other such options. For example, in the interface 300 illustrated in FIG. 3 the user can select another option 308 that enables the user to select an option to be used with the encryption. This can include, for example, specifying a type of encryption to be used for the transmission, a minimum level or score of encryption (as discussed later herein), or a policy to be used with the transmission. By selecting one or more policies for a message, a user can have some control over how the message is handled in various situations, as long as any server or agent receiving the message supports the policy as can be ensured using the transmission mechanisms discussed herein.

Upon receiving a message, a mail server can be configured to check the header of the message for a flag such as "keepEncrypted" or "keep_encrypted=true". If such a flag is present, the mail server can be configured to determine whether the next server or agent along the path supports the appropriate encryption settings and/or protocols. This occurs in some embodiments by connecting using a protocol such as TLS and issuing a query to determine the encryption capabilities that the next hop email server supports. If the next server does not support the appropriate encryption, the mail server can determine to not send the message on to the mail server and can instead take an alternative action, such as to cause the message to "bounce back" to the email client for the sender as being undeliverable. Other messages or actions can be utilized as well, as may be specified by one or more policies associated with the message. These can include, for example, sending a message to the intended recipient indicating that the message could not be delivered due to the lack of encryption along the transmission path, which may cause the recipient to inquire about upgrading the encryption, obtaining the message through other channels, etc. Each mail server or agent along the path can perform a similar operation, whereby the message is only delivered to the next hop if the specified encryption is supported. If at any hop along the path the specified encryption is not supported, the message will not be transmitted such that the encryption is ensured for any message that is transmitted to its intended destination. It should be pointed out that it is possible that an email server or agent might be compromised, which could result in the ability for content of the email message to be exposed, but at least in the current environment issues with compromised mail servers are much less significant than those for unencrypted transmission between servers and agents, as well as other such components.

As mentioned, in some embodiments a user (or other party or entity such as a mail administrator or mail client) can specify a policy to be utilized in the transmission of the mail message. The specifying of a policy can cause the message to only be delivered to servers or agents that support the specified policy. Further, the servers or agents receiving the message can enforce the policy on the transmission of the message. One example policy can be written in a dedicated policy language and can indicate that the message should only be transmitted to hops that support a particular encryption algorithm, or set of algorithms (i.e., RSA encryption with a key of at least a certain number of bits). The policy can also specify other aspects, such as the action to take if the message cannot be delivered due at least in part to one or more of the hops not supporting the policy or being able to abide by the terms of the policy. In some embodiments the policy can specify a minimum level or type of encryption, such that different policies can be selected based at least in part upon the sensitivity of the message. Policies can specify other requirements as well, such as a mail server having to have a certificate signed by an identified certificate authority (e.g., Verisign) in order to receive the message. Selecting a more restrictive policy can help ensure that the message is not intercepted or otherwise accessed by an unintended third party, but also can increase the likelihood that a message will not be delivered if the mail servers or agents along the path do not all support the more restrictive policy or policy requirements.

As mentioned, in at least some embodiments a flag or policy can be set manually by an end user or sender. In some embodiments such a flag or policy might be set automatically by a mail client, mail server, or other such system, service, or component. For example, a mail system might be configured to search for certain recipients, recipient domains, or content of a message and apply a flag to any message including such content. For example, a company might set up a rule that any message containing a term for a confidential project be transmitted with a certain level of encryption. Further, messages sent to certain recipients or recipient entities might be required to be transmitted using secure connections. In some embodiments, a user, email administrator, or other such entity can cause a policy to be applied to all messages sent, messages sent from or to a certain location, etc. Policies also can specify restriction-based criteria for delivering, or not delivering, a message to a next mail server along the path. For example, a message might not be able to be delivered to servers in a specified location, or a higher level of encryption might need to be used for delivery to a certain geographic location or domain, among other such options. Various rules can be set in place to cause messages to be flagged automatically, such as for messages with certain types of attachments or certain terminology in the subject lines, among other such options. One significant advantage of such an approach is that the users can be satisfied that messages will be sent encrypted without the need for the users to manage encryption keys or other security aspects, other than setting a flag, rule, or policy for the transmissions.

Figure 4:
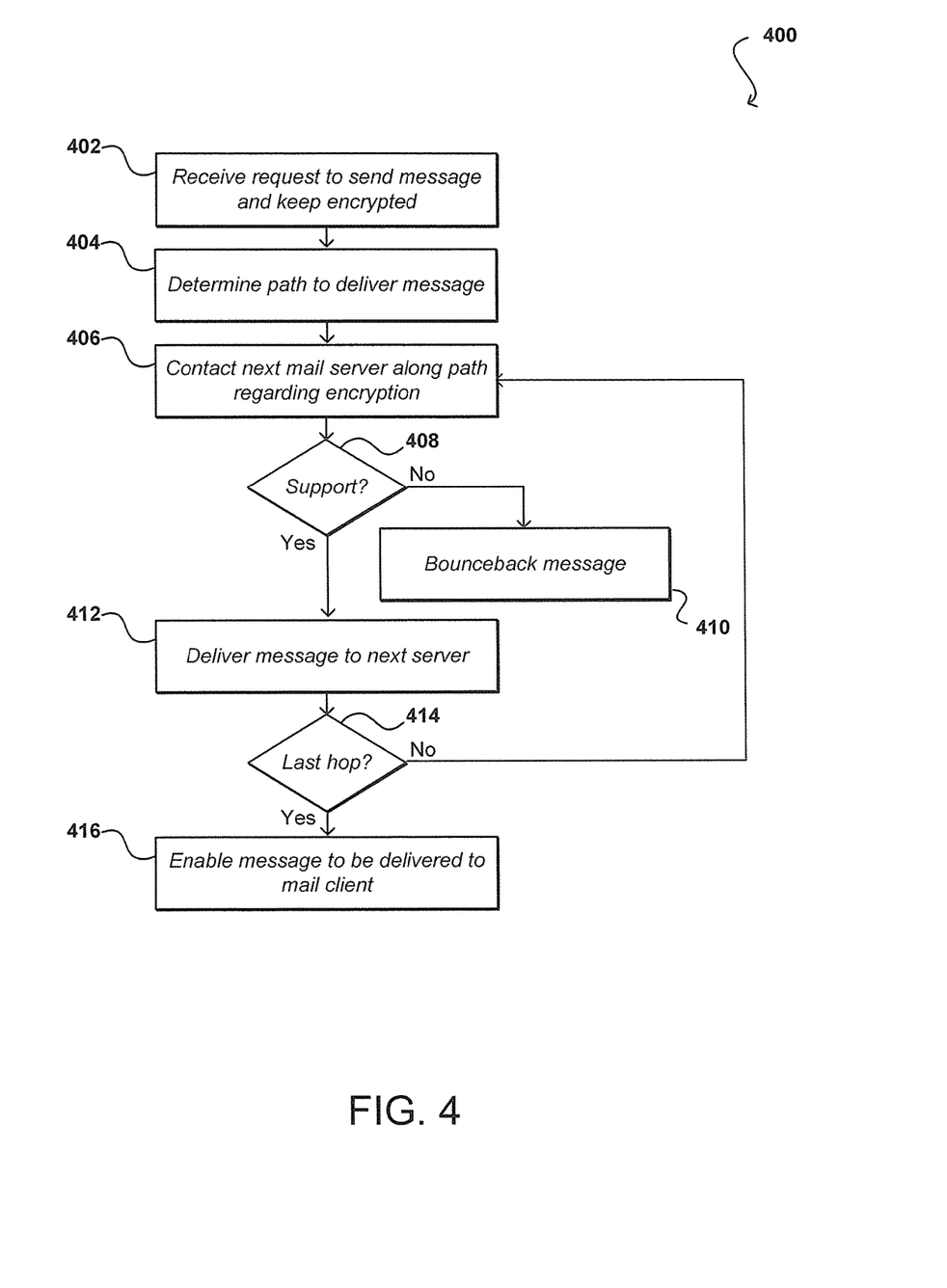
FIG. 4 illustrates a first example process for ensuring encrypted message delivery in accordance with various embodiments.

FIG. 4 illustrates an overview of an example process 400 for ensuring the encryption of transmitted messages that can be used in accordance with various embodiments. It should be understood that there can be fewer, additional, or alternative steps performed in similar or alternative orders, or in parallel, within the scope of the various embodiments unless otherwise stated. In this example, a request to send a message that is to be maintained encrypted can be received 402, such as to a first mail server or agent along a transmission path of the message. The server can be configured to scan the header of the message to detect a flag indicating that the message is to be kept encrypted during transmission. The server (or a related component) can then determine 404 the path over which to deliver the message, which will include information identifying the next "hop" or server along the path to which the message is to be delivered. In this example, the current server with the message can contact 406 the next mail server along the path to attempt to obtain information about the type(s) of encryption supported by the next mail server. A determination can be made 408 as to whether the next email server supports the specified encryption. This can include a specific type of encryption or encryption support, or can include at least a minimum level or score of encryption as discussed elsewhere herein. If the next server does not support the specified encryption, the message will not be delivered to the next server and another action can be taken, in this example triggering a bounceback message 410 to be delivered to the sender, whereby the sender can learn that the message was not delivered, potentially due to the lack of encryption support depending on the type of bounceback message provided.

If the next server along the path supports the specified encryption, the message can be delivered 412 to that server. The delivery can occur using any appropriate transmission and/or delivery mechanism for such purposes. In some embodiments, the delivery mechanism may change between hops. For example, if a first and second server agree on a first encryption methodology that satisfies the encryption criteria of the message and the second and third server agree on a second such methodology, different methodologies and/or approaches can then be used to transport the message between the respective pairs of servers. Even if the encryption methodologies are the same, the transmission mechanism can vary for some portions of the path. In some embodiments an option may exist where, if a mail server is aware of a recipient's (or sender's) public key then the mail server can optionally switch to using that form of encryption as long as the form of encryption satisfies any requirements for transmitting the message. This switch can be done transparently to the sender and without the sender having to manage any encryption keys. Regardless of any changes, all changes must satisfy the encryption criteria in order for the message to be delivered to its ultimate destination. If it is determined 414 that there are additional hops to the path, the process can continue with the server or agent currently hosting the message checking to see if the next hop supports the specified encryption. If the hop is the last hop (and the last hop does not correspond to the user device or mail client) then the message can be enabled 416 to be delivered to the appropriate mail client, either through automatic push, pull, or polling, or in response to a user requesting new messages, among other such options.

Figure 5:
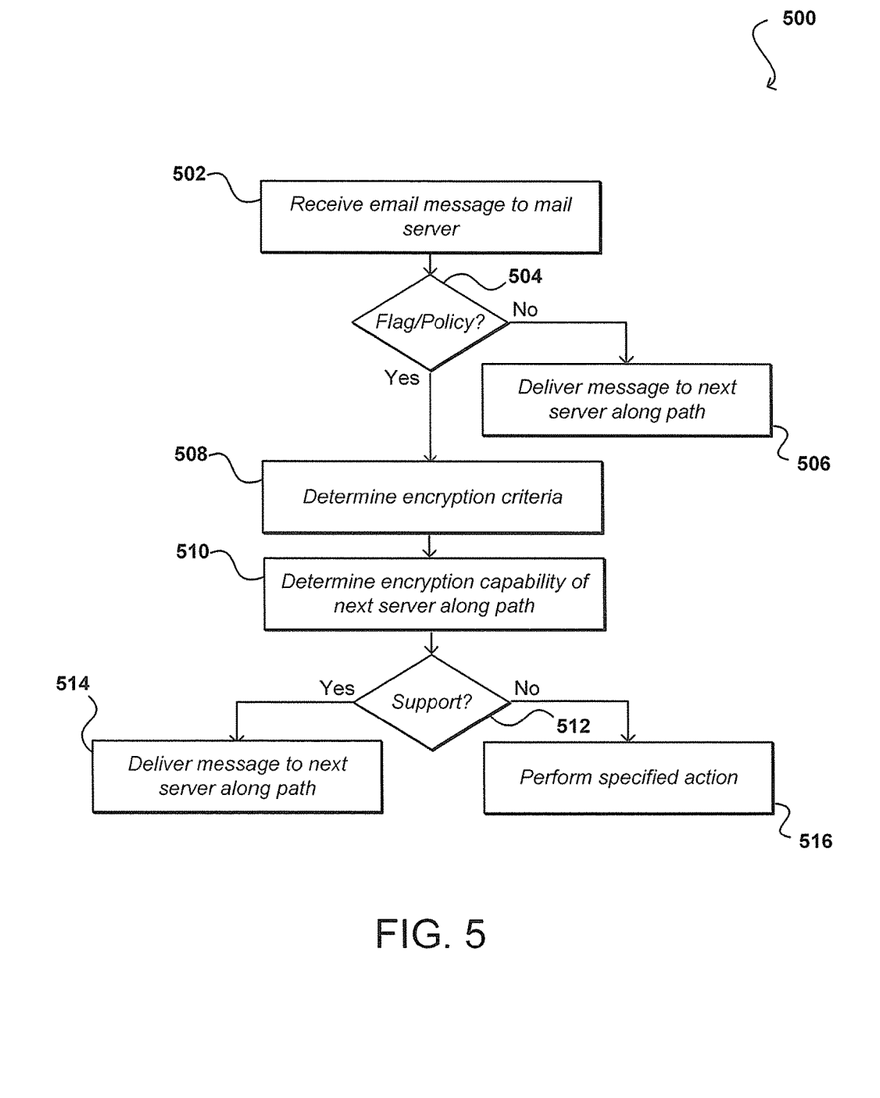
FIG. 5 illustrates a second example process for ensuring encrypted message delivery in accordance with various embodiments.

FIG. 5 illustrates another example process 500 that can be utilized in accordance with various embodiments. In this example, an email message is received 502 to a mail server, whether as a first hop or middle hop in a message delivery path. The email server can check the header of the message (or another appropriate location) to determine 504 whether a "keep encrypted" or similar flag, string, policy, or value is present that indicates that the message is to be kept encrypted during the delivery process. If no such flag or policy is located, the message can be delivered 506 to the next hop along the delivery path using a conventional process, which may include no encryption or opportunistic encryption, among other such options. If a flag or policy is present, either included in the header or otherwise identified by information in the message header, a determination can be made 508 as to the appropriate encryption or other criteria to apply. In some embodiments policies might be specified for any message received from a certain source or sent to a certain destination or recipient, for example, such that the policy does not need to be specified by each of those messages. Other approaches for specifying a policy can be used as well within the scope of the various embodiments. The encryption criteria can include, for example, the necessary criteria in order for the next server along the path to be sent the message, as well as how to handle the situation where the next server does not satisfy the criteria, as well as other decisions, instructions, and criteria discussed and suggested elsewhere herein. As mentioned, criteria other than those that relate to encryption can be specified as well, such as to not deliver messages in a certain region or to a certain domain, only utilize mail servers with a certain configuration or of a certain type, etc.

Once any encryption requirements, policy criteria, or other such information is discovered, the encryption capability (and/or any other specified capabilities) of the next server along the path can be determined 510. This can include, for example, sending an SMTP request to the next server regarding supported encryption and receiving back a response indicating the encryption and other capabilities supported by the next server. Alternatively the request can ask whether the next server supports a specific encryption methodology, or the highest encryption score that the next server supports, among other such options. If it is determined 512 that the next server along the path supports at least a minimum encryption methodology specified by the message, the message can be delivered 514 to the next server along the path, whereby the process can continue if that next server is not the last hop along the path. If the next server (or other hop) does not support the appropriate encryption, at least one specified action can be performed 516. The action can be specified by a policy, a mail administrator, or another appropriate source. The action can include, for example, causing a bounceback message to be sent to the sender, sending a notification message to the sender or recipient about the inability to transmit the message due to inadequate encryption, logging information about the denial for review by the intended recipient, or another such action.

In some embodiments a server may not need to reach out to the next server or agent along a path in order to determine the encryption supported by that server or agent. In some embodiments information can be added to the certificate of the mail server itself, such as by specifying one or more new attributes of the certificate. For example, an email encryption field can be added that indicates the type(s) of encryption supported by the server, the encryption score, a minimum level of encryption, or other such information. Such information enables the encryption support to be determined before even connecting to that server.

As mentioned, there can be various combinations of encryption factors or types that can be supported by a mail server or agent. As such, it can be impractical or at least undesirable to have to list all the combinations that are acceptable for transmission, as well as to update the combinations as new protocols and methodologies are introduced and/or updated. Accordingly, approaches in accordance with various embodiments can provide minimum or preferred criteria that can allow for variation in the way that the encryption requirements are met. In some embodiments, a scoring system can be used that can enable a score to be provided that indicates the minimum level of encryption or security that a mail server is able to support. A message can then include a flag or value that indicates an encryption threshold, or minimum encryption score, that the server must be able to meet in order to receive a message. A standardized (or at least agreed upon) mapping or scoring system can be generated whereby combinations of encryption factors can be scored and compared against the threshold in order to determine whether or not to pass along the message to the next hop, even if the next server supports different types of encryption than the current server. In some embodiments a sender and a recipient might each have a different encryption threshold specified, whereby the servers might have to utilize the higher of the two thresholds. When contacting a server, the server can provide its combinations or its score. To provide a score the servers must agree on a common scoring system. Otherwise a server can supply information about the supported encryption combinations, for example, and the receiving server can generate the score using its specified scoring system. In a situation where different scoring systems might be used, a message threshold might be set higher in order to ensure a minimum level of encryption. In some embodiments a message header might specify a scoring system to use, or specify different thresholds as part of a policy. Factors for use in determining a score can include, for example, the encryption algorithms supported, the length of keys supported, the signatures or hash algorithms used, the blocking modes available, and other such factors. A standardized mapping of scores can be updated as appropriate then pushed out to the appropriate servers. If a server received information for an encryption factor that is not in its mapping, the server can request an update in order to have the current list.

In some embodiments a message might also include information about a preferred encryption type, level, or score. For example, a message might be enabled to be transmitted between hops with at least a minimum score of encryption. If a server supports a higher score, or supports a preferred encryption, then the message can be sent using the preferred or higher approach, even if that means switching from an encryption used to send to the current server. In some embodiments the server can be instructed to use the highest supported score of encryption, or might be allowed to send using a score under the threshold if that score is obtained using a specific combination. In other words, a message might request to be sent using a specific encryption, but if that is not supported then an encryption methodology can be used only if that methodology results in a higher score than the requested encryption.

In some embodiments a server can obtain information about multiple potential hops along different delivery paths in order to select the optimal path. For example, a second server along the delivery path can query a server to obtain the supported encryption information, and if the information does not meet certain criteria the server can contact different servers until sufficient support is located, a maximum number of attempts is reached, or there are no more potential servers to act as the third hop. In some embodiments a server might contact multiple servers (in a common domain or otherwise) concurrently then select an optimal server (e.g., a server offering preferred encryption cipher support) to receive the message, among other such options.

Figure 6:
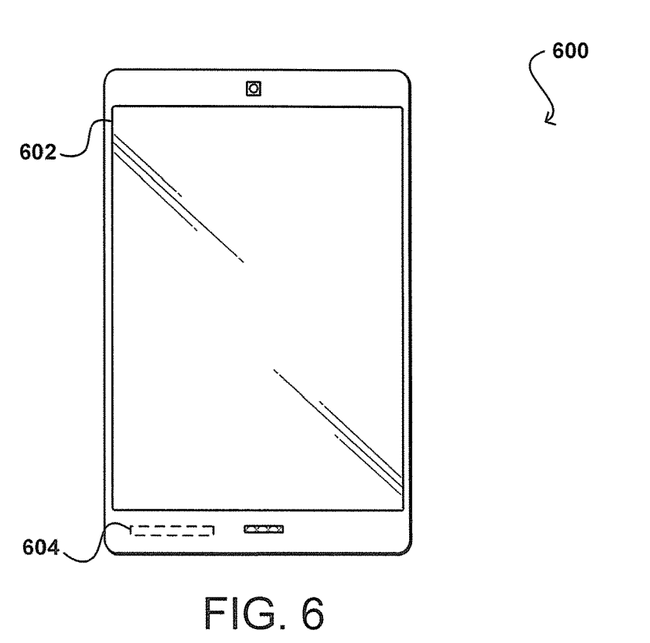
FIG. 6 illustrates an example client device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 602 operable to display information to a user facing the display screen (e.g., on the same side of the computing device as the display screen). The computing device can include various elements enabling a user to provide input to the device, such as a touch-sensitive display screen 602, at least one camera, a microphone, a keyboard or touchpad, or other such elements. The example computing device 600 also includes at least one communication mechanism 604 enabling the device to send and receive communications over at least one network. These networks can include, for example, a local area network (LAN), the Internet, an intranet, a cellular network, a wireless data communications network, and the like.

Figure 7:
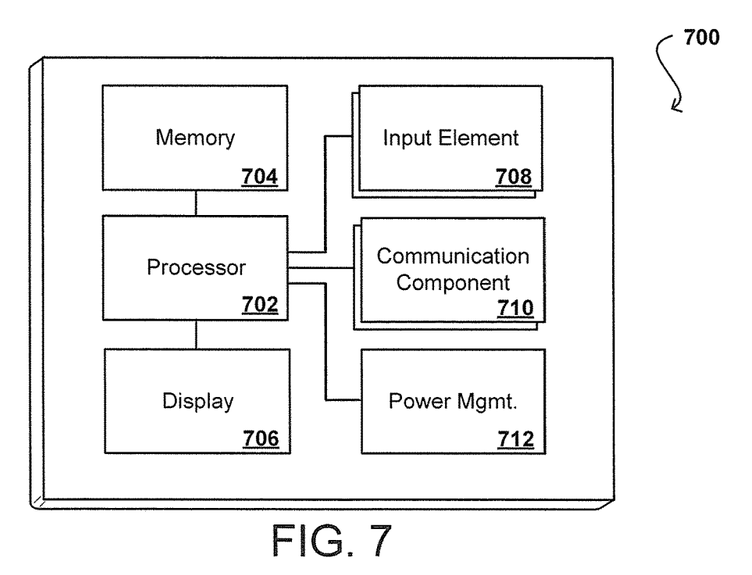
FIG. 7 illustrates example components of a client device such as that illustrated in FIG. 5.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more communication components 710, such as a Wi-Fi, Bluetooth, RF, wired, or wireless communication system. The device in many embodiments can communicate with a network, such as the Internet, and may be able to communicate with other such devices. The device 700 also can include at least one power management component 712, which can be implemented through hardware and/or software. This can include a battery and other appropriate components.

Figure 8:
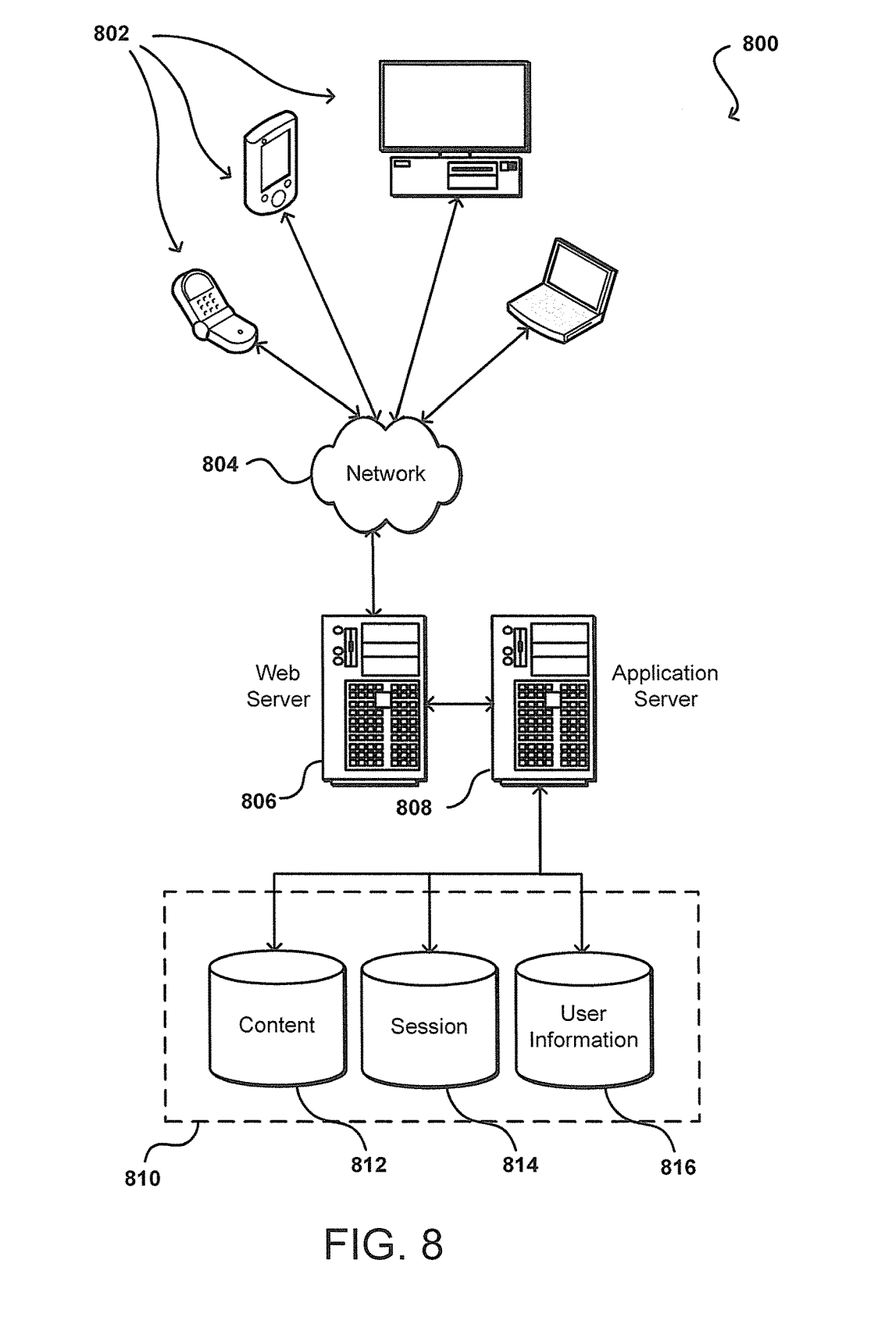
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other non-transitory computer-readable storage medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    an email client executable by a processor of a computing device, the email client configured to receive instructions to transmit an email message from the computing device to a destination, the email client further configured to enable an encryption flag to be added to a header of the email message and specify a type of transport layer encryption, the encryption flag indicating to use the type of the transport layer encryption during transmission of the email message to the destination; and
    an email server including an interface for receiving the email message from the email client, the email server configured to detect the encryption flag and determine a path to the destination, the email server further configured to submit a request to a next email server along the path to determine whether the next email server supports use of the type of the transport layer encryption for transmission of the email message and guarantees transmission of the email message using the type of the transport layer encryption, the email server further configured to receive a response from the next email server and, if the next email server supports and guarantees use of the type of the transport layer encryption for the transmission of the email message, transmitting the email message to the next email server.

2. The system of claim 1, wherein the email client is further configured to enable specification of the type of the transport layer encryption to be used for the transmission of the email message, and wherein the email server is further configured to determine the type of the transport layer encryption from the header of the email message and confirm that the next email server supports the type of the transport layer encryption before forwarding the email message to the next email server.

3. The system of claim 1, wherein the email server is further configured to not forward the email message to the next email server if the next email server does not support and guarantee use of the transport layer encryption for transmission of the email message.

4. The system of claim 3, wherein the email server is further configured to attempt to determine an alternative email server for a different path to the destination if the next email server does not support the type of the transport layer encryption, the email message being transmitted to the alternative email server only if the alternative email server supports the type of the transport layer encryption.

5. The system of claim 3, wherein the next email server is configured to, upon receiving the email message, verify that a subsequent mail server along the path guarantees the use of the type of the transport layer encryption for transmission of the email message before the next email server transmits the email message to the subsequent mail server.

6. A computer-implemented method, comprising:
    under control of one or more computer systems including configured with executable instructions,
    receiving an electronic message indicating a destination and a type of encryption to be used in transmission of the electronic message to the destination;
    determining whether a next message server along a path to the destination (1) supports using the type of the encryption for the transmission of the electronic message and (2) is configured to use the type of the encryption upon determining that the type of the encryption is to be used in the transmission; and
    forwarding the electronic message to the next message server along the path only if the next message server supports using, and is configured to use, the type of the encryption for the transmission of the electronic message.

7. The computer-implemented method of claim 6, further comprising:
    determining a policy specified by the electronic message, wherein determining whether the next message server supports using the type of the encryption includes determining whether the next message server supports the policy.

8. The computer-implemented method of claim 7, further comprising:
    determining, from the policy, a location-based criterion for transmission of the electronic message to the next message server; and
    causing a bounceback message to be generated for a sender of the electronic message if the next message server does not satisfy the location-based criterion.

9. The computer-implemented method of claim 6, further comprising:
    causing a bounceback message to be generated for a sender of the electronic message if the next message server along the path does not support and guarantee using the type of the type of the encryption for the transmission of the electronic message, whereby the electronic message is not delivered to the destination.

10. The computer-implemented method of claim 6, further comprising:
    sending, before or after the electronic message is received, a request to the next message server regarding the type of the encryption; and
    receiving a response from the next message server indicating whether the next message server supports using the type of the encryption.

11. The computer-implemented method of claim 6, further comprising:
    checking a certificate for the next message server to determine whether the next message server supports using the type of the encryption for the transmission of the electronic message.

12. The computer-implemented method of claim 6, further comprising:
    receiving the electronic message using a different type of encryption than is used to transmit the electronic message to the next message server.

13. The computer-implemented method of claim 6, further comprising:
    determining a minimum level of the type of the encryption specified by the electronic message, wherein the next message server must support using at least the minimum level of the type of the encryption for the transmission of the electronic message to the next message server to occur.

14. The computer-implemented method of claim 6, further comprising:
    determining a preferred type of the type of the encryption specified by the electronic message, wherein the transmission to the next message server is capable of being performed using two or more types of encryption, and wherein the transmission is to use the preferred type of the type of the encryption if available as one of the two more types of encryption.

15. The computer-implemented method of claim 6, further comprising:
    determining an encryption score for the next message server, the encryption score determined using a mapping of encryption types to encryption values, wherein the next message server must meet at least a specified encryption score threshold for the transmission of the electronic message to the next message server to occur.

16. The computer-implemented method of claim 6, further comprising:
    determining that a certificate for the next message server is from a trusted certificate authority before transmitting the electronic message to the next message server.

17. The computer-implemented method of claim 6, further comprising:
    determining a policy associated with the electronic message, the policy indicating at least one of encryption criteria for transmitting the electronic message or an action to take if the next message server does not support the type of the encryption.

18. A non-transitory computer-readable storage medium including instructions that, upon execution by a processor of a computing device, cause the computing device to:
    receive an electronic message indicating a destination and a type of transport level encryption to be used in transmission of the electronic message to the destination;
    determine whether a next message server along a path to the destination (1) supports the type of transport level encryption and (2) guarantees use of the type of transport level encryption for the transmission; and
    forward the electronic message to the next message server if the next message server supports and guarantees using the type of transport level encryption for the transmission.

19. The non-transitory computer-readable storage medium of claim 18, wherein the instructions when executed further cause the computing device to:
    use a mail transfer protocol to determine a plurality of paths to the destination; and
    select the path from the plurality of paths based at least in part upon mail servers along the selected path supporting the type of transport level encryption.

20. The non-transitory computer-readable storage medium of claim 18, wherein the instructions when executed further cause the computing device to:
    determine an encryption score for the next message server, the encryption score determined using values for at least one of encryption algorithms supported, a length of keys supported, signatures or hash algorithms used, or blocking modes available for the next message server, wherein the type of transport level encryption to be supported includes transport level encryption with at least a minimum encryption score.

21. The non-transitory computer-readable storage medium of claim 18, wherein the instructions when executed further cause the computing device to:
    determine a policy associated with the electronic message, the policy indicating at least one of encryption criteria for transmitting the electronic message or an action to take if the next message server does not support the type of transport level encryption.

* * * * *